(12) United States Patent
Ying et al.

(10) Patent No.: US 9,825,483 B2
(45) Date of Patent: Nov. 21, 2017

(54) CHARGING STATION, CHARGING SYSTEM AND METHOD FOR INDUCTIVE CHARGING

(71) Applicant: Sony Corporation, Tokyo (JP)

(72) Inventors: Zhinong Ying, Lund (SE); Turan Caliskan, Malmö (SE); Thomas Bolin, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 269 days.

(21) Appl. No.: 14/575,504

(22) Filed: Dec. 18, 2014

(65) Prior Publication Data

US 2016/0181848 A1    Jun. 23, 2016

(51) Int. Cl.
| | |
|---|---|
| H02J 7/00 | (2006.01) |
| H02J 7/02 | (2016.01) |
| H02J 50/12 | (2016.01) |
| H02J 50/10 | (2016.01) |
| H02J 50/40 | (2016.01) |
| H01F 38/14 | (2006.01) |

(52) U.S. Cl.
CPC ............ *H02J 7/025* (2013.01); *H01F 38/14* (2013.01); *H02J 7/0042* (2013.01); *H02J 50/10* (2016.02); *H02J 50/12* (2016.02); *H02J 50/40* (2016.02)

(58) Field of Classification Search
CPC .. H02J 5/005; H02J 7/025; H02J 50/10; H02J 50/12
USPC ........................................................ 320/108
See application file for complete search history.

(56) References Cited

U.S. PATENT DOCUMENTS

| | | | |
|---|---|---|---|
| 2005/0156560 A1* | 7/2005 | Shimaoka | H02J 7/0027 320/107 |
| 2007/0296393 A1* | 12/2007 | Malpas | A61B 5/0002 323/355 |
| 2011/0163714 A1* | 7/2011 | Ettes | H02J 7/025 320/108 |
| 2012/0223595 A1* | 9/2012 | Oodachi | H02J 17/00 307/104 |

(Continued)

FOREIGN PATENT DOCUMENTS

| | | |
|---|---|---|
| DE | 102 18 124 A1 | 11/2003 |
| EP | 2 161 811 A1 | 3/2010 |
| JP | 4-317527 | 11/1992 |

(Continued)

OTHER PUBLICATIONS

International Search Report, Application No. PCT/182015/053840, dated Aug. 17, 2015.

*Primary Examiner* — Drew A Dunn
*Assistant Examiner* — David V Henze-Gongola
(74) *Attorney, Agent, or Firm* — Myers Bigel, P.A.

(57) ABSTRACT

The present invention relates to a charging station for inductive charging of an electrical device having a rechargeable battery and a receiving induction coil. The charging station comprises: a housing comprising a plurality of panels forming an interior volume arranged to host the electrical device; a plurality of primary transmitting induction coils; and a controller arranged to excite the plurality of primary transmitting induction coils with charging current; wherein each of the plurality of primary transmitting induction coils is arranged at a separate panel of the housing.

8 Claims, 2 Drawing Sheets

(56) References Cited

U.S. PATENT DOCUMENTS

2012/0248893 A1* 10/2012 Teggatz ............... H01F 38/14
307/104

FOREIGN PATENT DOCUMENTS

| KR | 10-2008-0096919 A | 11/2008 |
|---|---|---|
| WO | WO 2013/051947 A1 | 4/2013 |

* cited by examiner

CHARGING STATION, CHARGING SYSTEM AND METHOD FOR INDUCTIVE CHARGING

TECHNICAL FIELD

The present invention relates to a charging station for inductive charging of an electrical device having a rechargeable battery and a receiving induction coil.

BACKGROUND

Inductive charging (also known as "wireless charging") uses an electromagnetic field to transfer energy between two objects. This is usually done with a charging station. Energy is sent through an inductive coupling to an electrical device (typically a portable device), which can then use that energy to charge batteries (or run the device).

Inductive charging uses a transmitting induction coil to create an electromagnetic field from the charging station, and a receiving induction coil in the electrical device takes power from the electromagnetic field and converts it back into electrical current to charge the battery. The two induction coils in proximity combine to form an electrical transformer.

Inductive charging of electrical devices such as phones and accessories (smartbands, watches, hearing aids, small loudspeakers, etc.) is an emerging technology and today 3 standards exists, namely A4WP, Powermat and Qi.

Common to all standards is that they use electromagnetic field transmission generated by a flat or a conventional coil and the field is then received by a similar flat coil in the device which has a rechargeable battery installed. The transmitting and receiving coils of such systems needs to be aligned such that the electromagnetic field transmitted get picked up by the receiving coil and for two flat such coils this means the receiving coil needs to be put on top and parallel to the transmitting coil for maximum energy transfer. If the receiving coil is put for example perpendicular to the transmitting coil no energy can be transferred. Practically it has been demonstrated that the A4WP resonance system can allow up to 5 cm distance between the coils for efficient power transfer for a 25 cm2 sized coil area. Turning the receiver coil vertically when the transmitting coil is horizontally oriented cuts the charging off as no magnetic flux can be picked up in this situation.

Hence, alignment of the receiving and transmitting coils is important for inductive charging. However, such alignment might be difficult to achieve.

SUMMARY OF THE INVENTION

In view of the above, it is an object of the present invention to provide charging station, system and method facilitating alignment of the receiving and transmitting coils.

According to a first aspect the above object is achieved by a charging station for inductive charging of an electrical device having a rechargeable battery and a receiving induction coil. The charging station comprises: a housing comprising a plurality of panels forming an interior volume arranged to host the electrical device; a plurality of primary transmitting induction coils; and a controller arranged to excite the plurality of primary transmitting induction coils with charging current; wherein each of the plurality of primary transmitting induction coils is arranged at a separate panel of the housing.

The plurality of primary transmitting induction coils, when excited with charging current, will exhibit magnetic flux in different directions. Hence, a receiving induction coil of an electrical device randomly oriented inside the housing will pick up adequate flux generated from at least one of the primary transmitting induction coils. The charging station may be used for charging a rechargeable battery of a plurality of electrical devices simultaneously. Each of the plurality of electrical devices may pick up adequate flux generated from different ones of the primary transmitting induction coils.

The controller may be arranged to excite the plurality of primary transmitting induction coils sequentially with charging current.

The plurality of panels may be orthogonally oriented.

The plurality of primary transmitting induction coils may be three in number.

The charging station may further comprise an additional transmitting induction coil, wherein the additional transmitting induction coil is arranged at an opposite side panel of the housing as one of the primary transmitting induction coils.

The charging station may further comprise a plurality of additional transmitting induction coils, wherein each of the additional transmitting induction coils is arranged at an opposite side panel of the housing as one of the primary transmitting induction coils.

The controller may be arranged to excite a primary transmitting induction coil and a thereto opposite additional transmitting induction coil simultaneously with charging current.

The charging station may further comprise a wireless communication receiver arranged to receive information from the electrical device the information comprising data pertaining to transmitted charging power, wherein the controller is arranged to limit or boost the charging current based on the information from the electrical device.

The charging station may further comprise a wireless communication receiver arranged to receive information from the electrical device the information comprising data pertaining to transmitted charging power, wherein the controller is arranged to excite a subset of the plurality of primary transmitting induction coils with the charging current based on the information from the electrical device.

The charging station may further comprise a wireless communication receiver arranged to receive information from the electrical device the information comprising data pertaining to transmitted charging power, wherein the controller is arranged to excite a single one of the plurality of primary transmitting induction coils with charging current based on the information from the electrical device.

The controller may be arranged to detect the primary transmitting induction coil among the plurality of primary transmitting induction coils that best transmit charging power to the receiving induction coil of the electrical device.

According to a second aspect the above object is achieved by an inductive charging system. The inductive charging system comprises an electrical device, comprising: a rechargeable battery; and a receiving induction coil. The inductive charging system further comprises a charging station, comprising: a housing comprising a plurality of panels forming an interior volume arranged to host the electrical device; a plurality of primary transmitting induction coils; and a controller arranged to excite the plurality of primary transmitting induction coils with charging current. Wherein each of the plurality of primary transmitting induction coils is arranged at a separate panel of the housing.

The electrical device may further comprise a wireless communication sender arranged to send information comprising data pertaining to charging transmission power, and wherein the charging station further comprises a wireless communication receiver arranged to receive the information being sent from the electrical device.

The above mentioned features of the charging station, when applicable, apply to this second aspect as well. In order to avoid undue repetition, reference is made to the above.

According to a third aspect the above object is achieved by a method for charging an electrical device comprising a rechargeable battery and a receiving induction coil, the method comprising: sequentially subjecting the electrical device for an inductive magnetic field from a plurality of sides of the electrical device.

The above mentioned features of the charging station and the charging system, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
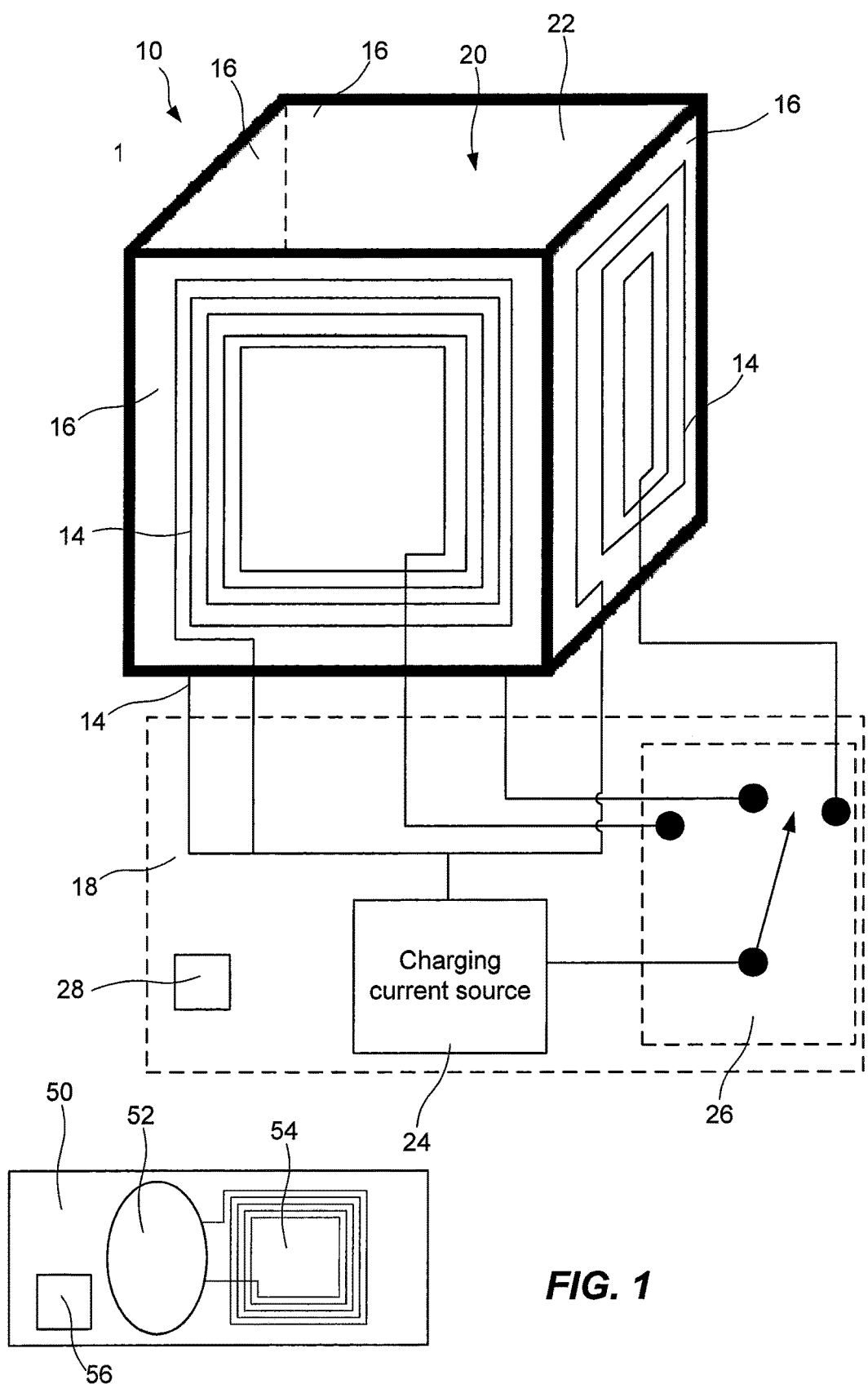
FIG. 1 is schematic view of a charging station and an electrical device.

FIG. 1 illustrates an electrical device 50 having a rechargeable battery 52 and a receiving induction coil 54 and a charging station 10 for inductive charging of the electrical device 50. The charging station comprises a housing 12, a plurality of primary transmitting induction coils 14 and a controller 18.

The housing 12 comprises a plurality of panels 16 forming an interior volume 20 arranged to host the electrical device 50. The panels 16 may, as in the in FIG. 1 shown embodiment, be orthogonally oriented. However, according to other embodiments, the panels 16 may be oriented with an angular separation between 135°-225°. The panels 16 may, as in the in FIG. 1 shown embodiment, be flat square-shaped panels which together form a box. Hence, the housing 12 may be box shaped. However, other forms of panels may also be used for forming the housing 12. For example, the panels may be vaulted and together forming a bowl shaped housing. The housing 12 has an opening 22 through which the device may be entered into the interior volume 20. The housing may comprise a lid (not shown) for closing/opening the opening 22.

Each of the plurality of primary transmitting induction coils 14 is arranged at a separate panel 16 of the housing 12. Hence, the charging station 10 comprises a plurality of in space oriented primary transmitting induction coils 14. The charging station 10 may then e.g. comprise a plurality of in space orthogonally oriented primary transmitting induction coils 14. In the in FIG. 1 shown embodiment, three primary transmitting induction coils 14 are arranged at a respective separate panel 16 of the housing 12. One primary transmitting induction coil 14 on the bottom panel 16, and two primary transmitting induction coils 14 on orthogonally oriented side panels 16.

The controller 18 is arranged to excite the plurality of primary transmitting induction coils 14 with charging current from a charging current source 24. The charging current may be AC-current. The exciting with charging current of the plurality of primary transmitting induction coils 14 is made sequentially. The controller 18 is arranged to excite each primary transmitting inductor coil 14 with charging current an appropriate amount of time, and then next primary transmitting inductor coil 14 is excited and so on. The sequencing speed, the time each primary transmitting inductor coil is on, is a subject for battery properties. Depending on battery properties the sequencing speed may be anything between milliseconds and hours of time for each transmitting coil to be excited. The sequencing time may be regulated using a sequencer 26 of the controller 18.

As the plurality of primary transmitting induction coils 14, when excited sequentially with charging current, will exhibit magnetic flux in different directions, one after the other, a receiving induction coil of an electrical device randomly oriented inside the housing 12 will pick up adequate flux generated from at least one of the primary transmitting induction coils 14. No alignment procedure between the electrical device to be charged and the charging station 10 is necessary. Typically one can put all electrical devices subject for charging into the housing completely randomly. Hence, an electrical device comprising a rechargeable battery and a receiving induction coil and being randomly oriented inside the housing will thus be wirelessly battery-charged independent of device orientation inside the housing. Accordingly, the plurality of primary transmitting induction coils 14 attached to the panels 16 of the housing 12 will by means of sequential excitation of charging current ensure that the electrical device get wirelessly charged. In case the plurality of primary transmitting induction coils 14 is orthogonally oriented, the plurality of primary transmitting induction coils 14, when excited sequentially with charging current, will exhibit magnetic flux in orthogonal directions, one after the other.

The electrical device 50 may comprise a wireless communication sender 56 arranged to send information comprising data pertaining to charging transmission power. The charging station 10 may further comprise a wireless communication receiver 28 arranged to receive the information from the electrical device 50. The wireless communication sender 56 and the wireless communication receiver 28 may be arranged to wirelessly communicate via short range radio such as Bluetooth or NFC. Alternatively, or in combination a wireless communication for e.g. send information comprising data pertaining to charging transmission power may be set up by modulation a link established between the transmitting induction coil or coils and the receiving induction coil. The modulation may be any one of or a combination of an amplitude modulation, a frequency-shift keying or a pulse width modulation.

The controller 18 may be arranged to limit or boost the charging current based on the information from the electrical device 50. Hence, the wireless communication link between the electrical device 50 and the charging station may be used for optimizing the inductive charging of the electrical device.

Moreover, additionally or in combination the controller 18 may be arranged to excite a subset of the plurality of primary transmitting induction coils 14 with the charging current based on the information from the electrical device 50. Alternatively, the controller 18 may be arranged to excite a single one of the plurality of primary transmitting induction coils 14 with charging current based on the information from the electrical device 50. Alternatively, the controller 18 may be arranged to excite a single one or a subset of the plurality of primary transmitting induction coils 14 during a longer time than the other primary transmitting induction coil (or coils) 14. In order to embody any of these embodiments for the controller 18 to excite a subset of the plurality of primary transmitting induction coils 14 at least more than the others the electrical device 50 may comprise a current supply sensor (not shown) which is arranged measure the received current over time and communicate this information, as the information comprising data pertaining to charging transmission power, to the charging station 10. By any of these embodiments of the controller 18 more efficient inductive charging of the electrical device may be performed. This since exciting with charging current of primary transmitting induction coils 14 not contributing to the inductive charging of the electrical device 50 is avoided.

Figure 2:
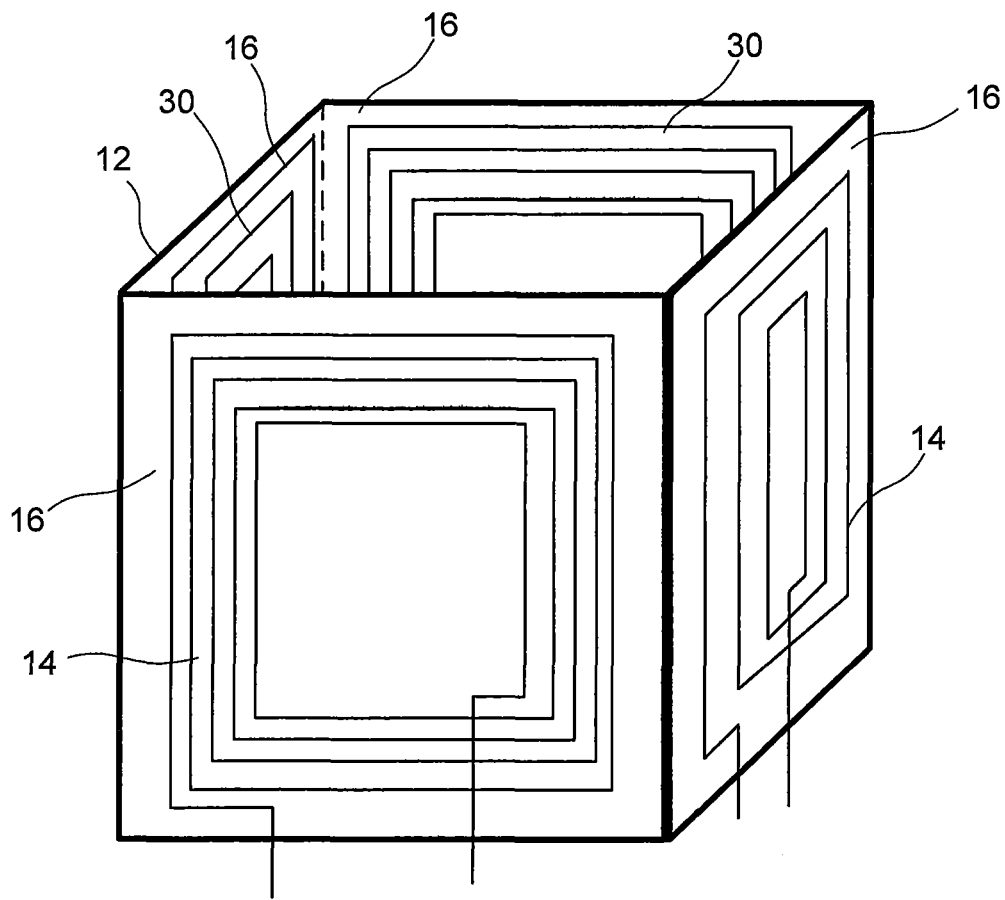
FIG. 2 is schematic view of an embodiment of a housing of a charging station.

In FIG. 2 an embodiment of the housing 12 of the charging station is shown. The controller of the charging station is not shown in FIG. 2 but it is realized that a controller according to any one of the disclosed embodiments may be used in combination with this embodiment of the housing 12. According to this embodiment of the housing comprises one or a plurality of additional transmitting induction coils 30. Each of the additional transmitting induction coils 30 is arranged at an opposite side panel 16 of the housing 12 as one of the primary transmitting induction coils 14. The controller 18 is arranged to excite a primary transmitting induction coil 14 and a thereto opposite additional transmitting induction coil 30 simultaneously with charging current. This will enhance the magnetic flux within the housing.

Figure 3:
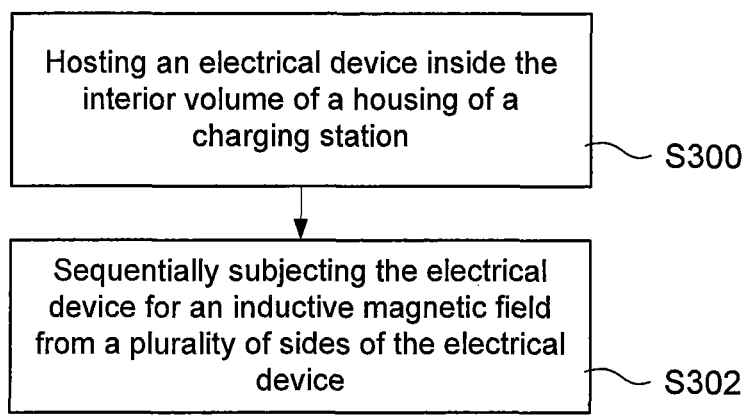
FIG. 3 is a block diagram of a method for charging an electrical device.

In FIG. 3 a block diagram of a method for charging an electrical device comprising a rechargeable battery and a receiving induction coil is shown. The method comprises sequentially subjecting S302 the electrical device for an inductive magnetic field from a plurality of sides of the electrical device. The method may also comprise hosting S300 the electrical device inside the interior volume of a housing of a charging station according an embodiment of the present invention. The subjecting S302 the electrical device for an inductive magnetic field from a plurality of sides of the electrical device may e.g. be made from a plurality of orthogonal sides of the electrical device.

The person skilled in the art realizes that the present invention by no means is limited to the preferred embodiments described above. On the contrary, many modifications and variations are possible within the scope of the appended claims.

For example, the charging station 10 may be used to wirelessly charge a plurality of electrical devices having a respective rechargeable battery and receiving induction coil.

Moreover, the controller 18 may be arranged to detect a primary transmitting induction coil 14 among the plurality of primary transmitting induction coils 14 that best transmit charging power to the receiving induction coil of the electrical device. This may e.g. be performed by sensing the resonance signature or reflected power at the transmitting inductor coil generator by means of directional couplers connected in series with each transmitting inductor coil. The output of a directional coupler are two signals; amount of forward transmitted power and amount of reflected power. The phase difference between these two signals pertain to a signature of the resonance. By this signature the primary transmitting induction coil 14 among the plurality of primary transmitting induction coils 14 that best transmit charging power to the receiving induction coil 54 of the electrical device 50 may be determined. By detect a primary transmitting induction coil 14 among the plurality of primary transmitting induction coils 14 that best transmit charging power to the receiving induction coil 54 of the electrical device 50 only exciting a subset or a single one of the plurality of primary transmitting induction coils 14 with charging current may be done. Alternatively, the primary transmitting induction coil (or coils) 14 that best transmit charging power to the receiving induction coil 54 may be excited duration a longer time period than the other primary transmitting induction coil (or coils) 14. This will result in a more efficient inductive charging of the electrical device may be performed. This since exciting with charging current of primary transmitting induction coils 14 not contributing to the inductive charging of the electrical device 50 is avoided.

Additionally, variations to the disclosed embodiments can be understood and effected by the skilled person in practicing the claimed invention, from a study of the drawings, the disclosure, and the appended claims.

The invention claimed is:

1. A charging station for inductive charging of an electrical device having a rechargeable battery and a receiving induction coil, the charging station comprising:
   a housing comprising a plurality of orthogonally oriented panels forming an interior volume arranged to host the electrical device;

first, second, and third pairs of primary transmitting induction coils, wherein the first, second and third pairs of primary transmitting induction coils are orthogonally oriented; and a controller configured to excite, in sequence, the first, second, and third pairs of primary transmitting induction coils with charging current, wherein exciting in sequence comprises activating only the first pair of primary transmitting induction coils for a first period of time, activating only the second pair of primary transmitting coils for a second period of time subsequent to the first period of time, and activating only the third pair of primary transmitting coils for a third period of time subsequent to the second period of time;

wherein each panel of the first, second, and third pairs of primary transmitting induction coils is arranged at a separate panel of the housing.

2. The charging station of claim 1, further comprising a wireless communication receiver arranged to receive information from the electrical device, the information comprising data pertaining to transmitted charging power, wherein the controller is configured to limit or boost the charging current based on the information from the electrical device.

3. The charging station of claim 1, further comprising a wireless communication receiver arranged to receive information from the electrical device the information comprising data pertaining to transmitted charging power, wherein the controller is configured to excite a subset of the first, second, and third pairs of primary transmitting induction coils with the charging current based on the information from the electrical device subsequent to the third period of time.

4. The charging station of claim 1, further comprising a wireless communication receiver arranged to receive information from the electrical device the information comprising data pertaining to transmitted charging power, wherein the controller is configured to excite, during a period of time subsequent to the third period of time, a single pair of the first, second, and third pairs of primary transmitting induction coils with charging current based on the information from the electrical device.

5. The charging station of claim 1, wherein the controller is configured to detect among the first, second, and third pairs of primary transmitting induction coils a primary transmitting induction coil pair that best transmits charging power to the receiving induction coil of the electrical device.

6. An inductive charging system, comprising:
an electrical device, comprising:
a rechargeable battery; and
a receiving induction coil; and
a charging station, comprising:
a housing comprising a plurality of orthogonally oriented panels forming an interior volume arranged to host the electrical device;
first, second, and third pairs of primary transmitting induction coils, wherein the first, second, and third pairs of primary transmitting induction coils are orthogonally oriented; and
a controller configured to excite, in sequence, the first, second, and third pairs of primary transmitting induction coils with charging current, wherein exciting in sequence comprises activating only the first pair of primary transmitting induction coils for a first period of time, activating only the second pair of primary transmitting coils for a second period of time subsequent to the first period of time, and activating only the third pair of primary transmitting coils for a third period of time subsequent to the second period of time;
wherein each panel of the first, second, and third pairs of primary transmitting induction coils is arranged at a separate panel of the housing.

7. The inductive charging system of claim 6, wherein the electrical device further comprises a wireless communication sender arranged to send information comprising data pertaining to charging transmission power, and wherein the charging station further comprises a wireless communication receiver arranged to receive the information being sent from the electrical device.

8. A method for charging an electrical device comprising a rechargeable battery and a receiving induction coil, the method comprising:
in sequence subjecting the electrical device to an inductive magnetic field from an orthogonally oriented first, second, and third pairs of sides of the electrical device, wherein subjecting in sequence comprises activating only the first pair of sides of the electrical device for a first period of time, activating only the second pair of sides of the electrical device for a second period of time subsequent to the first period of time, and activating only the third pair of sides of the electrical device for a third period of time subsequent to the second period of time.

* * * * *